(12) United States Patent
Baek et al.

(10) Patent No.: US 9,594,270 B2
(45) Date of Patent: Mar. 14, 2017

(54) LIQUID CRYSTAL DISPLAY

(71) Applicant: Samsung Display Co., Ltd., Yongin, Gyeonggi-Do (KR)

(72) Inventors: In-Su Baek, Seoul (KR); Yong Woo Kim, Seoul (KR); Sang A An, Daejeon (KR); Sang Hwan Lee, Asan-si (KR)

(73) Assignee: Samsung Display Co., Ltd., Gyeonggi-do (KR)

( * ) Notice: Subject to any disclaimer, the term of this patent is extended or adjusted under 35 U.S.C. 154(b) by 242 days.

(21) Appl. No.: 14/253,483

(22) Filed: Apr. 15, 2014

(65) Prior Publication Data
US 2015/0002757 A1 Jan. 1, 2015

(30) Foreign Application Priority Data
Jun. 27, 2013 (KR) ........................ 10-2013-0074855

(51) Int. Cl.
*G02F 1/1333* (2006.01)

(52) U.S. Cl.
CPC .... *G02F 1/133308* (2013.01); *G02F 1/13338* (2013.01); *G02F 2001/133317* (2013.01)

(58) Field of Classification Search
CPC ............. G02F 1/13308; G02F 1/13338; G02F 1/133322; G02F 1/133308; G02F 2001/133314; G02F 2001/133317; G02F 2001/13332; G06F 3/041; G06F 3/0412
See application file for complete search history.

(56) References Cited

U.S. PATENT DOCUMENTS

| | | | |
|---|---|---|---|
| 7,237,937 B2 | 7/2007 | Kawashima et al. | |
| 7,528,898 B2 | 5/2009 | Hashimoto | |
| 8,120,722 B2 | 2/2012 | Jung et al. | |
| 2006/0192657 A1 | 8/2006 | Nishimura et al. | |
| 2011/0193800 A1* | 8/2011 | Son | G02F 1/13338 345/173 |
| 2012/0231248 A1 | 9/2012 | Sato et al. | |
| 2015/0160494 A1* | 6/2015 | Shin | G02F 1/13338 345/173 |

FOREIGN PATENT DOCUMENTS

| | | |
|---|---|---|
| JP | 2007-065855 A | 3/2007 |
| JP | 2008-151898 A | 7/2008 |
| KP | 10-2009-0130775 A | 12/2009 |
| KR | 10-2007-0105659 A | 10/2007 |
| KR | 10-2010-0039143 A | 4/2010 |
| KR | 10-1085243 B1 | 11/2011 |

\* cited by examiner

*Primary Examiner* — Dung Nguyen
(74) *Attorney, Agent, or Firm* — Knobbe Martens Olson & Bear LLP

(57) ABSTRACT

A liquid crystal display having a support structure for a touch panel is disclosed. In one aspect of the described technology the LCD display includes a liquid crystal panel; a touch panel formed on the liquid crystal panel, and a backlight assembly formed under the liquid crystal panel and including a light emitting diode. In addition, a mold frame is configured to support the liquid display panel while surrounding the backlight assembly, a bottom chassis is configured to seat and support the backlight assembly and the mold frame, and a support structure is located under the touch panel and provides support for the touch panel.

18 Claims, 5 Drawing Sheets

LIQUID CRYSTAL DISPLAY

CROSS-REFERENCE TO RELATED APPLICATION

This application claims priority to and the benefit of Korean Patent Application No. 10-2013-0074855 filed in the Korean Intellectual Property Office on Jun. 27, 2013, the entire contents of which are incorporated herein by reference.

BACKGROUND

Field

The described technology generally relates to a liquid crystal display (LCD).

Description of the Related Technology

A display device such as a LCD or an organic light emitting display, a portable transmission device, and other information processing devices typically execute functions by using one or more input devices, often a touch panel.

Typically, a touch panel allows a machine such as a computer or the like to execute a desired command by bringing a finger or a touch pen (or a stylus) into contact with a screen to write a character, draw a picture, or activate an icon. The display device to which the touch panel is attached may identify whether a user's finger or a touch pen contacts the screen and the position or location of the contact.

In general, the touch panel is located on top of a display panel and the area of the touch panel is larger than the area of the display panel. Accordingly, the touch panel is exposed outside the periphery of the display panel when being formed, and a support structure for supporting the periphery of the touch panel is generally required.

The above information disclosed in this Background section is only for enhancement of understanding of the background of the invention and therefore it may contain information that is not prior art.

SUMMARY OF CERTAIN INVENTIVE ASPECTS

The described technology generally relates to a support structure for supporting a touch panel in a LCD including a touch panel.

At least one embodiment of the described technology provides a LCD including: a liquid crystal panel configured to display an image; a touch panel formed on the liquid crystal panel; a backlight assembly formed under the liquid crystal panel and including a light emitting diode (LED) supplying light to the liquid crystal panel; a mold frame configured to support the liquid display panel while surrounding the backlight assembly; a bottom chassis configured to seat and support the backlight assembly and the mold frame; and a support structure located under the touch panel and configured to support the touch panel, wherein the area of the touch panel is larger than the area of the liquid crystal panel, the touch panel includes a panel area corresponding to the liquid crystal panel and a peripheral area corresponding to a periphery of the panel area, and the support structure is fixed and attached to a lower surface of the peripheral area of the touch panel by an adhesive member.

The mold frame may include a body surrounding the backlight assembly and mold frame extensions extending from the body of the mold frame.

The mold frame extensions may include a first extension extending from the body of the mold frame, a second extension facing the first extension and extending in a direction substantially opposite to the first extension, and a third extension extending in a direction substantially perpendicular to an extending direction of the first extension.

The support structure may correspond to the first extension, the second extension, and the third extension.

The bottom chassis may include a body configured to seat and supports the backlight assembly and the mold frame, and bottom chassis extensions extending from the body of the bottom chassis.

The bottom chassis extensions may include a fourth extension extending from the body of the bottom chassis, a fifth extension facing the fourth extension and extending in a direction substantially opposite to the fourth extension, a sixth extension extending in a direction substantially perpendicular to an extending direction of the fourth extension.

The fourth extension, the fifth extension, and the sixth extension may be formed under the first extension, the second extension, and the third extension, respectively.

A plurality of first connecting members may be formed on each of the first extension, the second extension, and the third extension, and a plurality of openings may be formed on each of the fourth extension, the fifth extension, and the sixth extension.

Each of the first connecting members may penetrate each of the openings to attach the mold frame and the bottom chassis.

The LCD may further include a plurality of films attached to the liquid crystal panel, and a printed circuit board electrically connected to the films and configured to apply a driving signal to the liquid crystal panel through the films.

The mold frame may include a plurality of second connecting members formed on the body of the mold frame facing the third extension, each of the second connecting members may be located at a part corresponding to an interval between the plurality of films, and the plurality of films may be bent between the plurality of second connecting members.

The plurality of second connecting members may have a hook shape and hook the body of the bottom chassis.

The LCD may further include a sub supporter attached to the second connecting members.

The sub supporter may have a shape of "L", an upper surface of the sub supporter may be attached to a lower surface of the peripheral area of the touch panel by the adhesive member, and a side surface of the sub supporter may be attached to the second connecting members.

The sub supporter may have a shape of "C", an upper surface of the sub supporter may be attached to a lower surface of the peripheral area of the touch panel by the adhesive member, a side surface of the sub supporter may be attached to the second connecting members, and a fixing member may be formed on a lower surface of the sub supporter.

At least one embodiment of the described technology, the touch panel may be supported by using the extensions of the mold frame or the extensions of the bottom chassis and the sub supporter.

DETAILED DESCRIPTION OF CERTAIN INVENTIVE EMBODIMENTS

Figure 1:
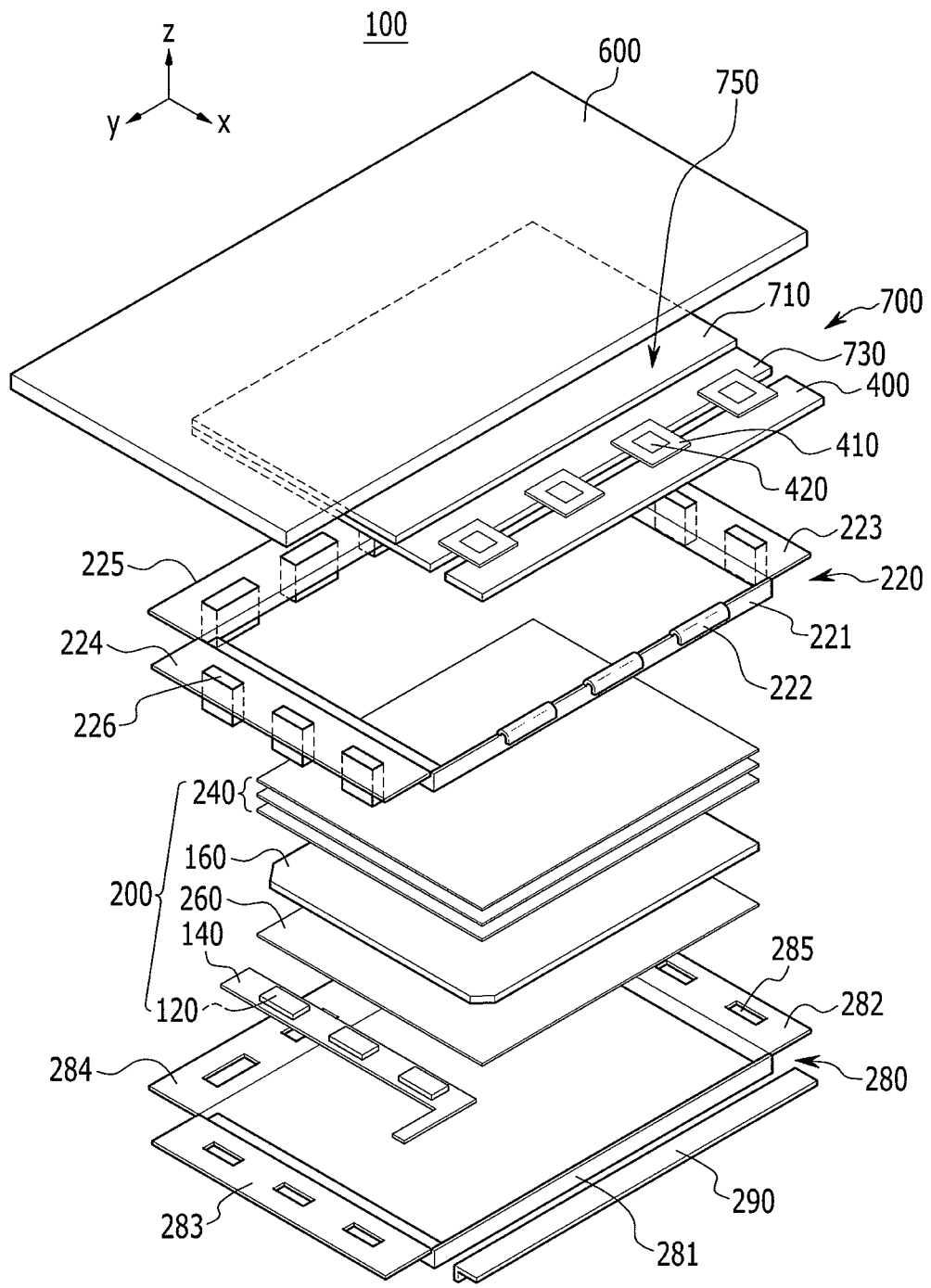
FIG. 1 is an exploded perspective view of a LCD according to an exemplary embodiment of the described technology.

Exemplary embodiments of the described technology will be described in detail with reference to the accompanying drawings. However, the described technology is not limited to the exemplary embodiments described herein, and may be embodied in another form. Rather, the exemplary embodiments introduced herein are provided to deliver the idea of the described technology to those skilled in the art.

In the drawings, the thickness of layers and regions are exaggerated for clarity. Also, when it is referred that a layer is "on" another layer or a substrate, it may be directly formed on another layer or the substrate or a third layer may be interposed therebetween. Like reference numerals designate like elements throughout the specification.

Figure 2:
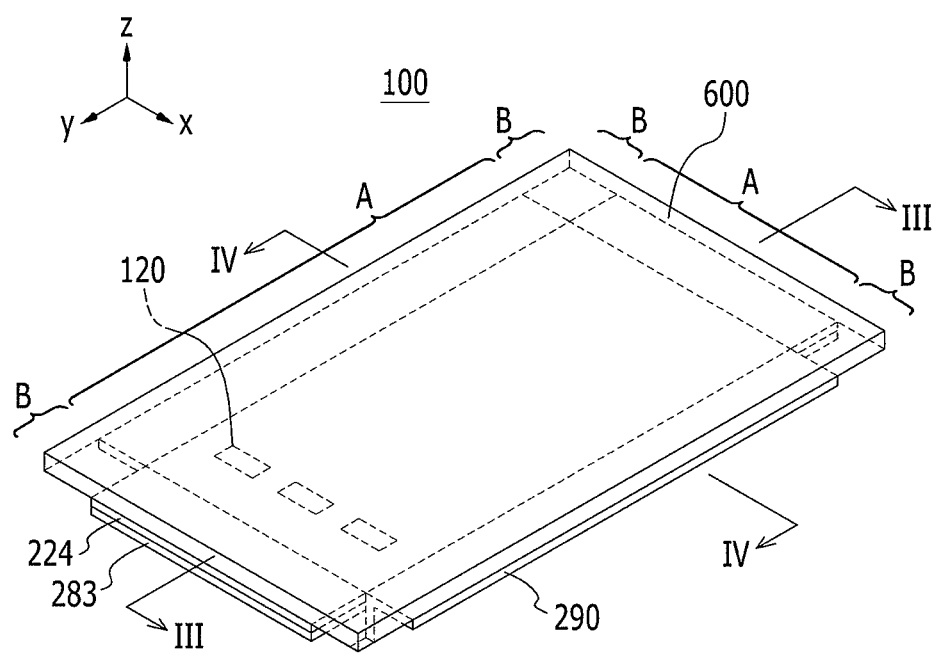
FIG. 2 is an exemplary assembled perspective view of the LCD according to FIG. 1.
Figure 3:
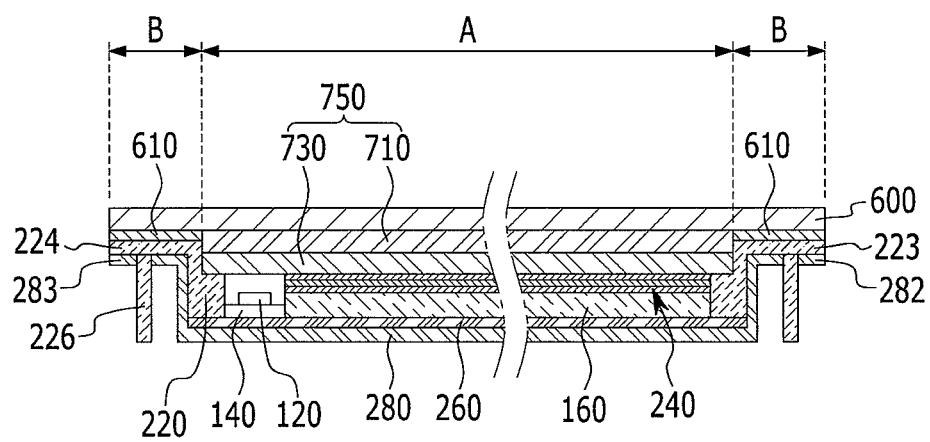
FIG. 3 is an exemplary cross-sectional view taken along line of FIG. 2.
Figure 4:
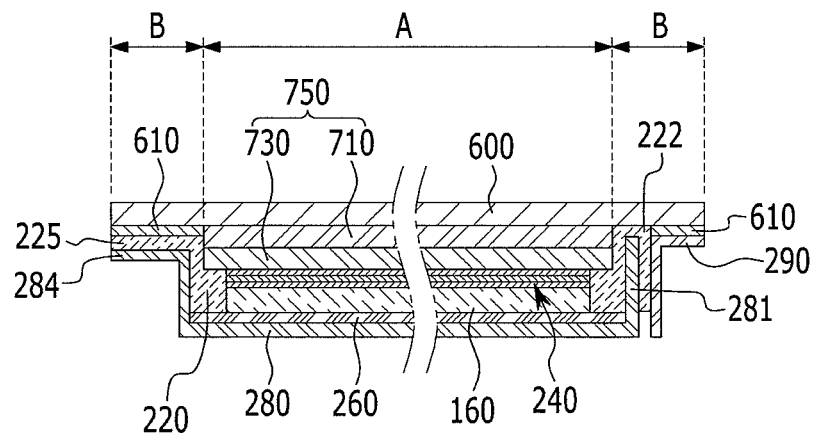
FIG. 4 is an exemplary cross-sectional taken along line IV-IV of FIG. 2.

FIG. 1 is an exploded perspective view of a LCD according to an exemplary embodiment of the described technology, FIG. 2 is an exemplary assembled perspective view of the LCD according to FIG. 1, FIG. 3 is an exemplary cross-sectional view taken along line of FIG. 2, and FIG. 4 is an exemplary cross-sectional view taken along line IV-IV of FIG. 2.

Referring to FIGS. 1 to 4, a LCD 100 according to the present exemplary embodiment includes a backlight assembly 200 for supplying light and a liquid crystal panel assembly 700 receiving light to display an image.

Further, the LCD 100 includes a mold frame 220 and a bottom chassis 280 for fixing and supporting the backlight assembly 200 and the liquid crystal panel assembly 700.

Moreover, the LCD 100 includes a touch panel 600 that executes a desired command by bringing a finger or a touch pen (or a stylus) into contact with a screen to write a character, draw a picture, or execute an icon.

Furthermore, the LCD 100 may include a protective window for protecting the touch panel 600 from impact and inflow of a foreign substance from the outside.

The liquid crystal panel assembly 700 includes a liquid display panel 750 displaying an image, a plurality of films (IC chips on films, COF) 410 electrically connected with the liquid crystal panel 750 to supply a driving signal, and a printed circuit board 400.

The liquid crystal panel 750 includes a thin film transistor array panel 730 including a plurality of thin film transistors, a color filter display panel 710 located on the thin film transistor array panel 730, and a liquid crystal (not shown) injected between the thin film transistor array panel 730 and the color filter display panel 710. Here, the thin film transistor array panel 730 and the color filter display panel 710 may be referred to as a first display panel and a second display panel, respectively.

Polarizers (not shown) are attached to an upper part of the color filter display panel 710 and a lower part of the thin film transistor array panel 730 to polarize light that penetrates the liquid crystal panel 750.

The thin film transistor array panel 730 includes a transparent glass substrate on which the thin film transistor on a matrix is formed. A data line is electrically connected to a source terminal of the thin film transistor, a gate line is electrically connected to a gate terminal, and a pixel electrode formed of indium tin oxide ITO corresponding to a conductive material is electrically connected to a drain terminal.

The color filter display panel 710 is formed on the thin film transistor array panel 730 to face the thin film transistor array panel 730. The color filter display panel 710 is a substrate on which a color filter for revealing a predetermined color while light penetrates the color filter is formed through a thin film process, and a front surface is doped with a common electrode formed of ITO.

When an electrical signal from the printed circuit board 400 is input into the data line and the gate line of the liquid crystal panel 750, the electrical signal is input into the source terminal and the gate terminal of the thin film transistor, and the thin film transistor is turned on or turned off according to the input of the electrical signal thereof, so that an electrical signal required for forming a pixel is output to the drain terminal.

When power is applied to the gate terminal and the source terminal of the thin film transistor and thus the thin film transistor is turned on, an electric field is generated between the pixel electrode and the common electrode of the color filter display panel. An arrangement angle of the liquid crystal injected between the thin film transistor array panel 730 and the color filter display panel 710 is changed by the electric field, and accordingly, light transmittance is changed according to the changed arrangement angle, thereby acquiring a desired image.

The printed circuit board 400 is electrically connected to the plurality of films 410 attached to the liquid crystal panel 750. The plurality of films 410 are spaced apart from each other at predetermined intervals.

The printed circuit board 400 generates a data driving signal corresponding to a signal for driving the LCD 100, a gate driving signal, and a plurality of timing signals for applying the signals at a proper time, and applies the gate driving signal and the data driving signal to the gate line and the data line of the liquid crystal panel 750, respectively, through the films 410 to which IC chips 420 are mounted.

The backlight assembly 200 for providing uniform light to the liquid crystal panel 750 is formed under the liquid crystal panel 750.

The backlight assembly 200 is fixed to the mold frame 220, and includes one or more LEDs 120 supplying light to the liquid crystal panel 750 and a LED power source substrate 140 supplying power to the LEDs 120.

Further, the backlight assembly 200 includes a light guide plate 160 guiding light emitted from the LEDs 120 to supply the light to the liquid crystal panel 750, a reflective sheet 260 formed under the light guide plate 160 to reflect light, and optical sheets 240 formed on the light guide plate 160 to provide a luminance characteristic of light secured from the LEDs 120 to the liquid crystal panel 750.

An upper side and a lower side of the mold frame 220 are open, and the mold frame 220 surrounds the backlight assembly 200. Further, the mold frame 220 supports the liquid crystal panel 750.

The mold frame 220 includes a body 221 surrounding the backlight assembly 200, and a first extension 223, a second extension 224, and a third extension 225 which extend in three directions from the body 221.

The first extension 223 and the second extension 224 face each other and extend in opposite directions, and the third extension 225 extends in a direction perpendicular to the extending direction of the first extension 223.

A plurality of first connecting members 226 are formed on each of the lower surfaces of the first extension 223, the second extension 224, and the third extension 225.

Further, a plurality of second connecting members 222 are formed on the. body 221 of the mold frame 220. The second connecting members 222 face the third extension 225 and are located on parts corresponding to intervals between the films 410.

The bottom chassis 280 includes a body 281 for seating and supporting the backlight assembly 200 and the mold frame 220, and a fourth extension 282, a fifth extension 283, and a sixth extension 284 which extend in three directions from the body 281.

The fourth extension 282 and the fifth extension 283 face each other and extend in opposite directions, and the sixth extension 284 extends in a direction perpendicular to the extending direction of the first extension 223.

A plurality of openings 285 are formed on each of the fourth extension 282, the fifth extension 283, and the sixth extension 284.

The fourth extension 282, the fifth extension 283, and the six extension 284 of the bottom chassis 280 are located under the first extension 223, the second extension 224, and the third extension 225 of the mold frame 220 to support the first extension 223, the second extension 224, and the third extension 225, respectively.

The mold frame 220 and the bottom chassis 280 are fixed and attached to each other by the first connecting members 226 and the second connecting members 222. Each of the first connecting members 226 penetrates each of the openings 285 to attach the mold frame 220 and the bottom chassis 280, and the second connecting members 222 hook the body 281 of the bottom chassis 280 in a hook shape to attach the mold frame 220 and the bottom chassis 280.

The panel 600 is located on the liquid crystal panel 750 and is larger than the liquid crystal panel 750. Accordingly, the touch panel 600 includes a panel area A corresponding to the liquid crystal panel 750 and a peripheral area B corresponding to a peripheral of the panel region A. The touch panel 600 may be a resistive type touch panel, a capacitive type touch panel, or an electromagnetic inductive type touch panel.

The peripheral area B of the touch panel 600 is formed on the first extension 223, the second extension 224, and the third extension 225 of the mold frame 220 and is fixed to the first extension 223, the second extension 224, and the third extension 225 by an adhesive member 610. Here, the adhesive member 610 may be a double-sided adhesive tape.

That is, the first extension 223, the second extension 224, and the third extension 225 of the mold frame 220, and the fourth extension 282, the fifth extension 283, and the sixth extension 284 of the bottom chassis 280 formed under the first extension 223, the second extension 224, and the third extension 225, respectively serve as supporters supporting the touch panel 600.

Meanwhile, the plurality of films 410 attached to the liquid crystal panel 750 are bent outside the body 221 of the mold frame 220 and the body 281 of the bottom chassis 280, and the printed circuit board 400 electrically connected to the films 410 is located under the bottom chassis 280. The films 410 are bent between the second connecting members 222 when the films 410 are bent.

As the plurality of films 410 are bent outside the body 221 of the mold frame 220 and the body 281 of the bottom chassis 280, the first extension 223, the second extension 224, and the third extension 225 of the mold frame 220, and the fourth extension 282, the fifth extension 283, and the sixth extension 284 of the bottom chassis 280 are not formed on parts corresponding to the films 410.

That is, the first extension 223, the second extension 224, and the third extension 225 extend from the body 221 of the mold frame 220, but the extensions do not extend from a part of the body 221 of the mold frame 220 corresponding to the films 410.

Further, the fourth extension 282, the fifth extension 283, and the sixth extension 284 extend from the body 281 of the bottom chassis 280, but the extensions do not extend from a part of the body 281 of the bottom chassis 280 corresponding to the films 410.

A sub supporter 290 is formed on the part corresponding to the films 410.

The sub supporter 290 is attached and fixed to the peripheral area B of the touch panel 600 by the adhesive member 610. Accordingly, the sub supporter 290 supports the touch panel 600 in the part corresponding to the films 410.

The sub supporter 290 is attached to the second connecting members 222 in a shape of "L". At this time, the sub supporter 290 may be attached to the second connecting members 222 by an adhesive or a screw.

As described above, the touch panel 600 may be supported by the first extension 223, the second extension 224, and the third extension 225 of the mold frame 220, the fourth extension 282, the fifth extension 283, and the sixth extension 284 of the bottom chassis 280 formed under the first extension 223, the second extension 224, and the third extension 225, respectively, and the sub supporter 290.

Then, a LCD according to another exemplary embodiment of the described technology will be described with reference to FIG. 5.

Figure 5:
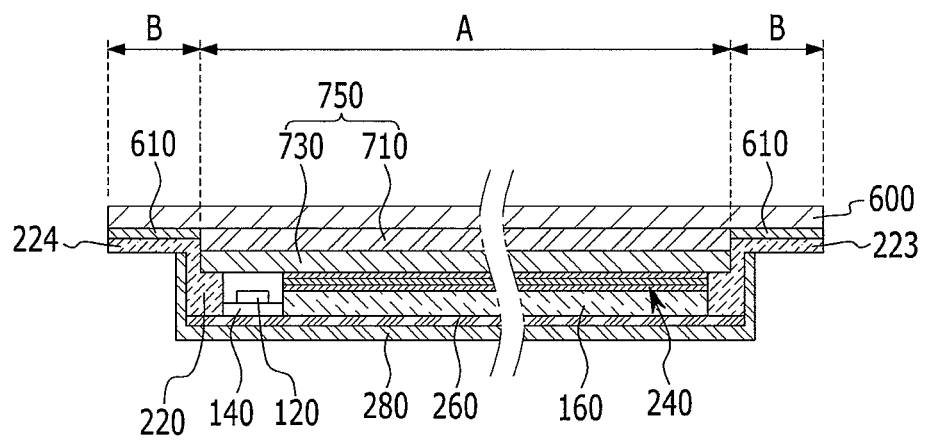
FIG. 5 is a cross-sectional view of a LCD according to another exemplary embodiment of the described technology.

FIG. 5 is a cross-sectional view of a LCD according to another exemplary embodiment of the described technology.

Referring to FIG. 5, compared to the LCD according to FIG. 1, the LCD according to the present exemplary embodiment has a similar structure with different shapes of the mold frame 220 and the bottom chassis 280.

The touch panel 600 is located on the liquid crystal panel 750 and includes the panel area A corresponding to the liquid crystal panel 750 and a peripheral area B corresponding to the periphery of the panel area A.

The peripheral area B of the touch panel 600 is formed on the first extension 223, the second extension 224, and the third extension 225 of the mold frame 220 and is fixed to the first extension 223, the second extension 224, and the third extension 225 by the adhesive member 610. Here, the adhesive member 610 may be a double-sided adhesive tape.

Further, the plurality of second connecting members 222 is formed on the body 221 of the mold frame 220. The second connecting members 222 face the third extension 225 and are located at parts corresponding to the films 410.

That is, the second connecting members 222 serve as a supporter supporting the touch panel 600 together with the first extension 223, the second extension 224, and the third extension 225 of the mold frame 220.

Meanwhile, unlike the structure of the LCD according to, FIG. 1, the first connecting members 226 are not formed on the first extension 223, the second extension 224, and the third extension 225.

The bottom chassis 280 seats and supports the backlight assembly 200 and the mold frame 220, and the extensions are not formed on the bottom chassis 280 unlike the structure of the LCD according to FIG. 1.

Also, in the LCD according to the present exemplary embodiment, the extensions of the mold frame 220 are not formed on the part corresponding to the films 410, but the sub supporter 290 is formed on the part corresponding to the films 410 to support the touch panel 600.

That is, the touch panel 600 may be supported by the first extension 223, the second extension 224, and the third extension 225 of the mold frame 220, and the sub supporter 290.

Then, a LCD according to still another exemplary embodiment of the described technology will be described with reference to FIG. 6.

Figure 6:
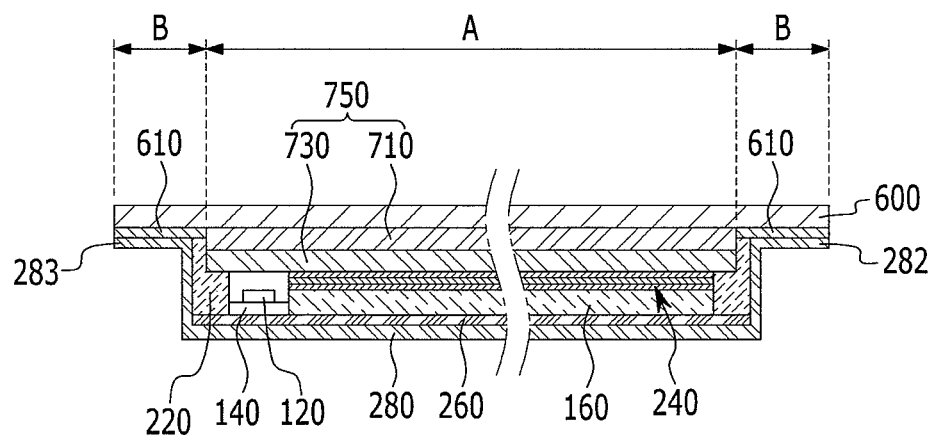
FIG. 6 is a cross-sectional view of a LCD according to still another exemplary embodiment of the described technology.

FIG. 6 is a cross-sectional view of a LCD according to still another exemplary embodiment of the described technology.

Referring to FIG. 6, compared to the LCD according to FIG. 1, the LCD according to the present exemplary embodiment has a similar structure with only different shapes of the mold frame 220 and the bottom chassis 280.

The touch panel 600 is located on the liquid crystal panel 750 and includes the panel area A corresponding to the liquid crystal panel 750 and a peripheral area B corresponding to the periphery of the panel area A.

The peripheral area B of the touch panel 600 is formed on the fourth extension 282, the fifth extension 283, and the sixth extension 284 of the bottom chassis 280 and is fixed to the fourth extension 282, the fifth extension 283, and the sixth extension 284 by the adhesive member 610. Here, the adhesive member 610 may be a double-sided adhesive tape.

That is, the fourth extension 282, the fifth extension 283, and the sixth extension 284 of the bottom chassis 280 serve as a supporter supporting the touch panel 600.

Meanwhile, unlike the structure of the LCD according to FIG. 1, the openings 285 are not formed on the fourth extension 282, the fifth extension 283, and the sixth extension 284.

The mold frame 220 surrounds the backlight assembly 200, and the extensions of the mold frame 220 are not formed unlike the structure of the LCD according to FIG. 1. However, the plurality of second connecting members 222 having the same structure as that of the LCD according to FIG. 1 are formed on the body 221 of the mold frame 220. The second connecting members 222 are located at parts corresponding to intervals between the films 410.

Also, in the LCD according to the present exemplary embodiment, the extensions of the bottom chassis 280 are not formed on the part corresponding to the films 410, but the sub supporter 290 is formed on the part corresponding to the films 410 to support the touch panel 600.

That is, the touch panel 600 may be supported by the fourth extension 282, the fifth extension 283, and the sixth extension 284 of the bottom chassis 280, and the sub supporter 290.

Then, a sub supporter according to another exemplary embodiment of the described technology will be described with reference to FIG. 7.

Figure 7:
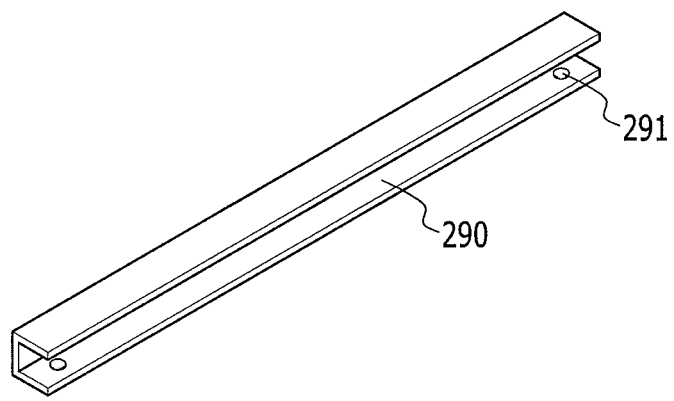
FIG. 7 is a perspective view of a sub supporter according to another exemplary embodiment of the described technology.

FIG. 7 is a perspective view of a sub supporter according to another exemplary embodiment of the described technology.

Referring to FIG. 7, the sub supporter 290 according to the present exemplary embodiment has a shape of "C". An upper surface of the sub supporter 290 is fixed and attached to the touch panel 600 by the adhesive member 610 to support the touch panel 600. A side surface of the sub supporter 290 is attached to the second connecting members 222. At this time, the sub supporter 290 may be attached to the second connecting members 222 by an adhesive or a screw.

Further, a fixing member 291 for being fixed and attached to another place by a consumer is attached to a lower surface of the sub supporter 290.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A liquid crystal display (LCD), comprising:
a liquid crystal panel configured to display an image;
a touch panel formed on the liquid crystal panel;
a backlight assembly formed under the liquid crystal panel and including a light emitting diode (LED) supplying light to the liquid crystal panel;
a mold frame configured to support the liquid crystal panel while surrounding the backlight assembly, wherein the mold frame includes a body surrounding the backlight assembly and a plurality of mold frame extensions extending from the body of the mold frame in a length direction and/or a width direction of the body; and
a bottom chassis configured to seat and support the backlight assembly and the mold frame, wherein the bottom chassis includes a body configured to seat and supports the backlight assembly and the mold frame, and a plurality of bottom chassis extensions extending from the body of the bottom chassis in a length direction and/or a width direction of the body of the bottom chassis,
wherein the area of the touch panel is larger than the area of the liquid crystal panel, and
wherein the touch panel includes a panel area corresponding to the liquid crystal panel and a peripheral area corresponding to a periphery of the panel area,
wherein the mold frame extensions are fixed and attached to a lower surface of the peripheral area of the touch panel by an adhesive member,
wherein the mold frame extensions include:
a first extension extending from the body of the mold frame in the length direction of the body of the mold frame,
a second extension facing the first extension and extending in the length direction of the body of the mold frame, and
a third extension extending in the width direction of the body of the mold frame, and
wherein the bottom chassis extensions include:
a fourth extension extending from the body of the bottom chassis in the length direction of the body of the bottom chassis,
a fifth extension facing the fourth extension and extending in the length direction of the body of the bottom chassis, and
a sixth extension extending in the width direction of the body of the bottom chassis.

2. The LCD of claim 1, wherein the fourth extension, the fifth extension, and the sixth extension are formed under the first extension, the second extension, and the third extension, respectively.

3. The LCD of claim 2, wherein a plurality of first connecting members are formed on each of the first extension, the second extension, and the third extension, and
a plurality of openings are formed on each of the fourth extension, the fifth extension, and the sixth extension.

4. The LCD of claim 3, wherein each of the first connecting members penetrates each of the openings to attach the mold frame and the bottom chassis.

5. The LCD of claim 4, further comprising a plurality of films attached to the liquid crystal panel and a printed circuit board electrically connected to the films and configured to apply a driving signal to the liquid crystal panel through the films.

6. The LCD of claim 5, wherein the mold frame includes a plurality of second connecting members formed on the body of the mold frame facing the third extension,
each of the second connecting members is located at a part corresponding to an interval between the plurality of films, and
the plurality of films are bent between the plurality of second connecting members.

7. The LCD of claim 6, wherein the plurality of second connecting members have a hook shape and hook the body of the bottom chassis.

8. The LCD of claim 7, further comprising a sub-supporter attached to the second connecting members.

9. The LCD of claim 8, wherein the sub-supporter has an "L" shape, an upper surface of the sub supporter is attached to a lower surface of the peripheral area of the touch panel by the adhesive member, and
a side surface of the sub supporter is attached to the second connecting members.

10. The LCD of claim 8, wherein the sub-supporter has a "C" shape,
an upper surface of the sub supporter is attached to a lower surface of the peripheral area of the touch panel by the adhesive member,
a side surface of the sub supporter is attached to the second connecting members, and
a fixing member is formed on a lower surface of the sub supporter.

11. The LCD of claim 1, wherein the mold frame extensions are in direct physical contact with sides of the liquid crystal panel.

12. A liquid crystal display (LCD), comprising:
a liquid crystal panel configured to display an image;
a touch panel formed on the liquid crystal panel;
a backlight assembly formed under the liquid crystal panel and including a light emitting diode (LED) supplying light to the liquid crystal panel;
a mold frame configured to support the liquid crystal panel while surrounding the backlight assembly,
a bottom chassis configured to seat and support the backlight assembly and the mold frame, wherein the bottom chassis includes a body configured to seat and supports the backlight assembly and the mold frame, and a plurality of bottom chassis extensions extending from the body of the bottom chassis in a length direction and/or a width direction of the body of the bottom chassis,
wherein the area of the touch panel is larger than the area of the liquid crystal panel, and
wherein the touch panel includes a panel area corresponding to the liquid crystal panel and a peripheral area corresponding to a periphery of the panel area,
wherein the mold frame extensions are fixed and attached to a lower surface of the peripheral area of the touch panel by an adhesive member, and
wherein the bottom chassis extensions include:
a fourth extension extending from the body of the bottom chassis in the length direction of the body of the bottom chassis,
a fifth extension facing the fourth extension and extending in the length direction of the body of the bottom chassis, and
a sixth extension extending in the width direction of the body of the bottom chassis.

13. The LCD of claim 12, further comprising a plurality of IC chips on films attached to the liquid crystal panel and a printed circuit board electrically connected to the films and configured to apply a driving signal to the liquid crystal panel through the films.

14. The LCD of claim 13, wherein the mold frame includes a plurality of second connecting members formed on the body of the mold frame,
each of the second connecting members is located at a part corresponding to an interval between the films, and
the films are bent between the plurality of second connecting members.

15. The LCD of claim 14, wherein the plurality of second connecting members have a hook shape and hook the body of the bottom chassis.

16. The LCD of claim 15, further comprising a sub-supporter attached to the second connecting members.

17. The LCD of claim 16, wherein the sub supporter has an "L" shape,
an upper surface of the sub supporter is attached to a lower surface of the peripheral area of the touch panel by the adhesive member, and
a side surface of the sub supporter is attached to the second connecting members.

18. The LCD of claim 16, wherein the sub-supporter has a "C" shape,
an upper surface of the sub supporter is attached to a lower surface of the peripheral area of the touch panel by the adhesive member,
a side surface of the sub supporter is attached to the second connecting members, and
a fixing member is formed on a lower surface of the sub supporter.

* * * * *